March 5, 1957  I. B. SPEVAK  2,783,538
COMBINED DAIRY FOOD CONTAINER AND CUTTER
Filed Oct. 11, 1954  2 Sheets-Sheet 1

INVENTOR.
IRVING B. SPEVAK

March 5, 1957     I. B. SPEVAK     2,783,538
COMBINED DAIRY FOOD CONTAINER AND CUTTER
Filed Oct. 11, 1954     2 Sheets-Sheet 2
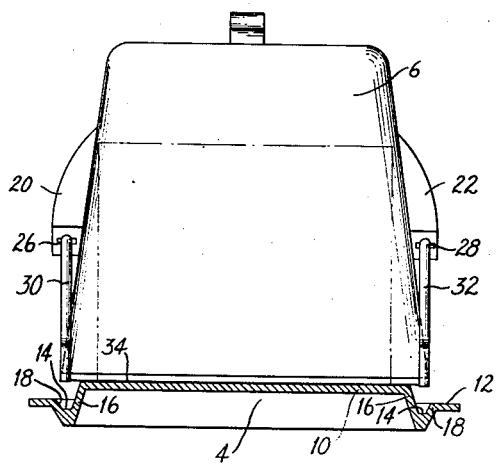
FIG.3
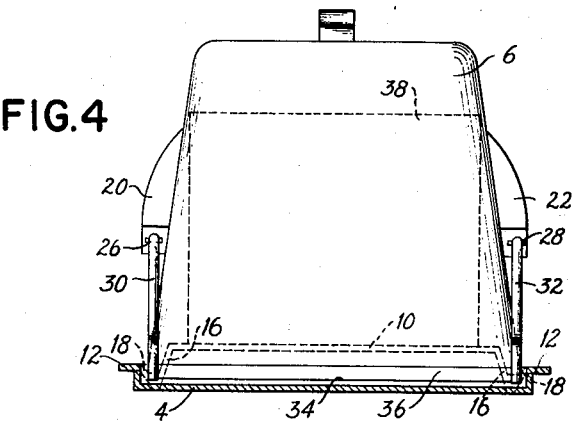
FIG.4
FIG.5
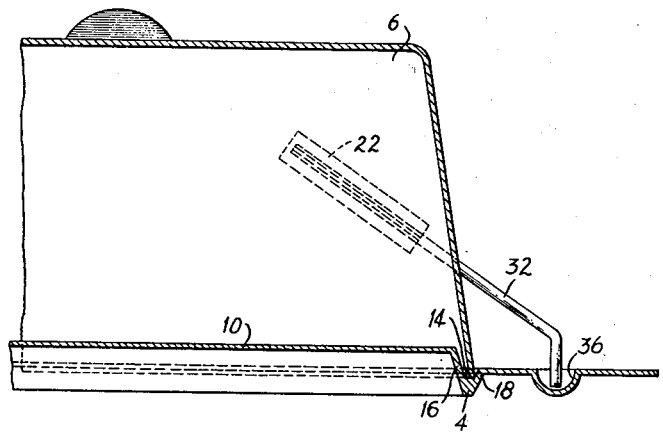
FIG.6
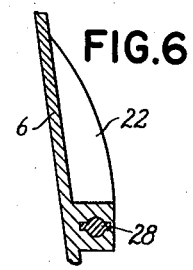
INVENTOR.
IRVING B. SPEVAK

United States Patent Office 2,783,538
Patented Mar. 5, 1957

2,783,538

COMBINED DAIRY FOOD CONTAINER AND CUTTER

Irving B. Spevak, Poughkeepsie, N. Y.

Application October 11, 1954, Serial No. 461,368

1 Claim. (Cl. 31—25)

This invention relates to containers and more particularly to a combined container and cutting implement for foods such as cheeses and other dairy products.

For simplification in description, this invention will be described as a combined cheese container and cutter, but it is to be understood that such use is not intended as a limitation, but rather it is intended to illustrate more clearly the operating features and principles of the invention.

In handling cheese, it is most convenient to remove the wrapping and store the cheese in a container adapted for a sealing engagement with a cover, thereby preventing dehydration of the cheese. There are many such containers on the market, but the main trouble with them is that the sealing lip of the container lies in a plane above the bed that holds the cheese. In cutting a piece of cheese, therefore, the sealing lip gets in the way by preventing a cutting tool from passing all the way through the cheese.

Accordingly, it is a first object of this invention to provide a food container of the subject type wherein the food bed lies in a plane above the sealing lip, thereby mounting the food so that a cutting tool may pass clearly through it.

With further reference to food containers of the subject type, a second problem is presented in cutting the food; that is, after the cover has been removed, a separate cutting tool generally is employed, and in most households a search is necessary before the cutting tool can be found. It is a further object of this invention, therefore, to provide a combined food container and cutting tool.

Further objects and advantages of my invention will become apparent as the following description proceeds and the features of novelty which characterize my invention will be pointed out with particularity in the claim annexed to and forming part of this specification.

Briefly, this invention relates to a two-piece food container having a food-mounting bed portion and a cover for engaging a peripheral sealing lip surrounding the bed, thereby providing a relatively air-tight food storage chamber when the cover is properly engaged with the bed. Further, the cover is provided with an integral cutting tool whereby when the cover has been removed, it acts as a handle for a cutting tool which is then used to slice the food mounted on the food bed.

Figure 1:
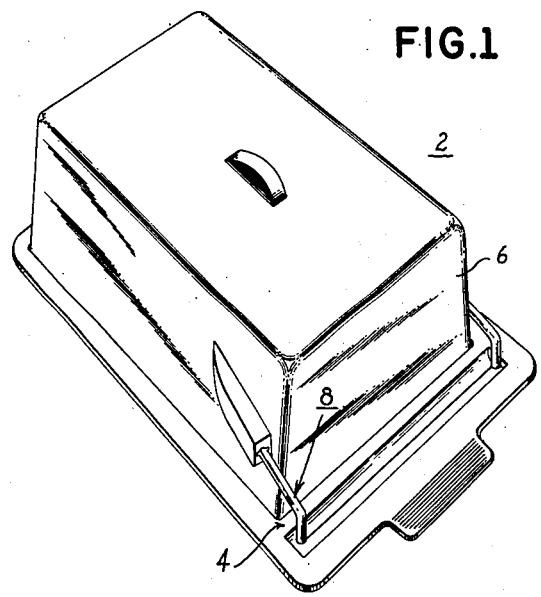
Figure 2:
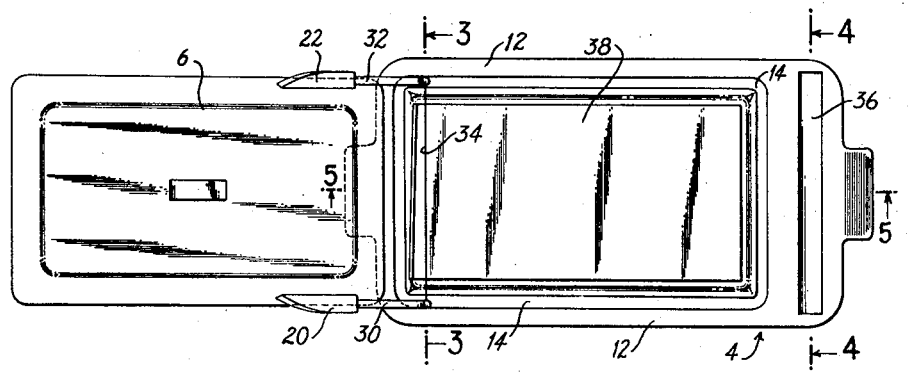

Referring to the drawings, Fig. 1 is a perspective view of an improved combination food container and cutter; Fig. 2 is a plan view showing the food cutter in operation; Fig. 3 is an end elevation, partly in section, showing how the cover and bed are engaged; Fig. 4 is an end elevation, partly in section, showing the combination food container and cutter as assembled; Fig. 5 is a side elevation of the combination food container and cutter as assembled; while Fig. 6 is a sectional view of the mounting arrangement for the food slicer.

In the drawings, a combined food container and cutter 2 is shown comprising a base 4, a cover 6, and a cutter 8. Preferably, the entire combination, except the cutter, is made of one of the molded plastics.

With particular reference to Fig. 3, the base 4 comprises a mounting bed 10 and a sealing lip 12. It is particularly important that the bed 10 be arranged to lie in a plane above the sealing lip, thereby preventing the lip from obstructing the path of a cutter moving down through the stored food toward the mounting bed 10. Lip 12 is arranged to peripherally surround the bed 10 and to provide a groove 14 for housing the coplementary edges of the cover. Since the purpose of the lip-cover engagement is to seal out air, the groove 14 is formed with slanted sides 16, 18, thereby reducing to a minimum any air gaps at the sealing edge.

The cover 6 obviously can have any contour, but preferably it is in the form of a hollow truncated rectangular pyramid having an angle approximately equal to the sloping sides 16 that help form the groove 14.

With this structure of the sides of the cover 6, and the inner side 16 of the groove 14, a tight air seal is provided for the central food storing section that is formed when the cover and base are assembled.

At one end, a pair of opposite sides of the cover are provided with bosses 20, 22 for mounting the cutter 8. Specifically, each boss has an axial bore 26, 28, which bosses are either eccentric or grooved as shown in the disclosed embodiment to receive the side supports 30, 32 of a cutting wire 34. The supports 30, 32 are contoured to engage the bores 26, 28, respectively, in a manner that will prevent rotation of the supports.

Rotation of the supports 30, 32 should be prevented, since in the usual construction, and particularly in the embodiment disclosed (Fig. 2), the cutter 34 is a wire tensioned between the supports 30, 32. Consequently, any turning of a support about its axis would release the tension in the cutting wire and hence destroy the efficiency of the cutter.

In order to protect the cutting wire 34, the base 4 is provided with a groove 36 for housing the ends of the supports 30, 32 and also the cutting wire 34. With this construction, the cutting wire is stored out of the way when the cover is assembled in sealing relation with the base.

With the construction of the elements as described, the improved combination cutter and storage device operates as follows: Assuming a block of cheese 38 is mounted on the bed 10, the cover 6 may then be removed and held in one hand so that the cutter 34 will slice through the block of cheese as shown in Fig. 2. Once again, since the mounting bed 10 is in a plane above the sealing lip 12, there will be no interference with the cutting operation. The cover 6 can then be replaced and the combination stored in the refrigerator.

While there have been shown and described particular embodiments of this invention, it will be obvious to those skilled in the art that various changes and modifications can be made therein without departing from the invention, and, therefore, it is aimed in the appended claim to cover all such changes as fall within the true spirit and scope of the invention.

What I claim as new and desire to secure by Letters Patent of the United States is:

A combined food storage container and cutter comprising a base portion including a central mounting and cutting bed for an article of food stored in said container, a sealing lip peripherally bounding said mounting bed and lying in a plane below said mounting bed, a detachable cover member including a top and depending sides, said sides defining a peripheral edge, said edge being in engagement with said sealing lip, a pair of support arms respectively rigidly connected to opposite sides of said cover member and extending beyond said cover member at a given end thereof, and a cutting wire extending between said support members beyond said cover member.

References Cited in the file of this patent

UNITED STATES PATENTS

| | | |
|---|---|---|
| 606,838 | Heins | July 5, 1898 |
| 1,516,582 | Spalding | Nov. 25, 1924 |
| 2,595,696 | Paul | May 6, 1952 |
| 2,617,190 | Taylor | Nov. 11, 1952 |